Feb. 12, 1924.
H. W. EDWARDS
1,483,791
BLOW-OUT PATCH
Filed March 26, 1923
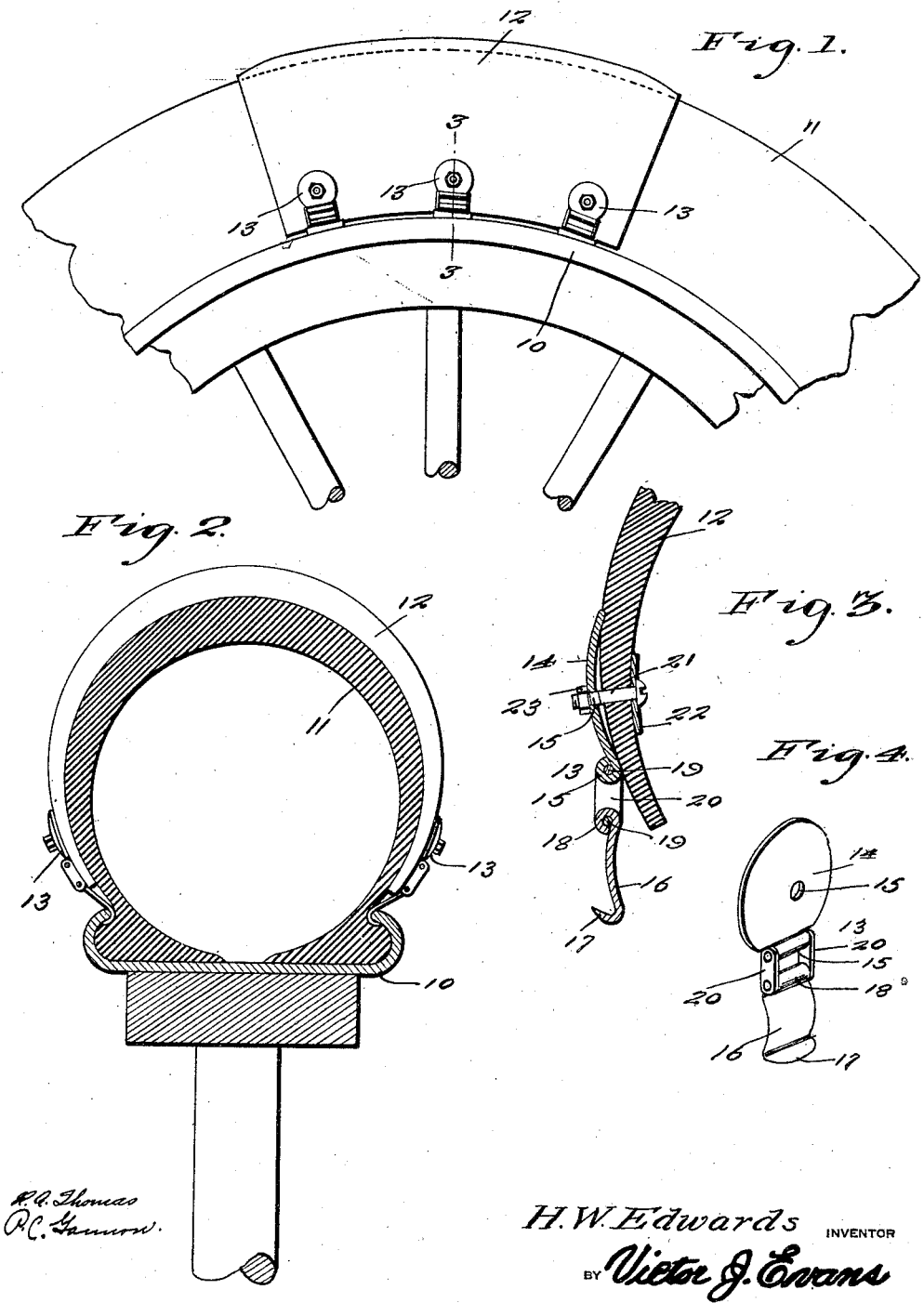
H. W. Edwards INVENTOR
BY Victor J. Evans ATTORNEY Patented Feb. 12, 1924.

1,483,791

UNITED STATES PATENT OFFICE.

HARLEY W. EDWARDS, OF THETFORD MINES WEST, QUEBEC, CANADA.

BLOW-OUT PATCH.

Application filed March 26, 1923. Serial No. 627,723.

*To all whom it may concern:*

Be it known that I, HARLEY W. EDWARDS, a citizen of the United States, residing at Thetford Mines West, in the Province of Quebec and Dominion of Canada, have invented new and useful Improvements in Blow-Out Patches, of which the following is a specification.

This invention relates to improvements in protectors for pneumatic tires and has for an object the provision of means whereby a blow-out patch, boot or the like may be attached to the rim of a wheel, over a tire in a manner to permit the patch or boot to follow the movements of the tire without disturbing its engagement with the rim.

With the above and other objects in view, the invention further includes the following novel features and details of construction, to be hereinafter more fully described, illustrated in the accompanying drawings and pointed out in the appended claim.

In the drawings:—

Figure 1 is a fragmentary elevation of a portion of a vehicle with the invention applied.

Figure 2 is a transverse sectional view of the same.

Figure 3 is an enlarged section on the line 3—3 of Figure 1.

Figure 4 is a detail perspective view of one of the attaching devices.

Referring in detail to the drawings, wherein like characters of reference denote corresponding parts, the reference character 10 indicates the rim of a vehicle wheel having a pneumatic tire 11 applied thereto.

The protector which if desired, may extend entirely around the circumference of the tire, is herein shown in the form of a blow-out patch and indicated at 12. This patch extends transversely of the tire and is provided along each side edge with a plurality of attaching devices which are indicated generally at 13. These devices each include a hollow plate 14 having a central opening therein and a sleeve 15 extending from its edge. The attaching device further includes a tapered rim engaging member 16 which terminates at one end in a hook 17, the latter engaging the rim of the wheel as shown. By making the plate 14 of hollow formation, its edges will more readily grip the patch, while the tapered formation of the member 16 prevents the tire from being sufficiently separated from the rim at this point to allow of the entrance of dirt. The opposite end of the member 16 is provided with a sleeve 18 and this sleeve and the sleeve 15 have extending therethrough pins 19 whose opposite ends are connected by links 20. A flexible joint is thus provided between the plate 14 and the attaching member 16.

The attaching devices 13 are held in place by screws 21 which pass through openings provided in the plates 14 and through plates or washers 22 upon the inside of the patch 12. These screws may be secured by nuts 23 or riveted or both.

By means of the present invention, the protector may be readily attached in place over a pneumatic tire, the latter being deflated and the hooks of the members 16 engaged with the rim 10, after which inflation of the tire will act to hold the protector securely in place. When in use, the protector will follow all of the movements of the tire, while the member 16 will remain stationary due to the free flexible connection between said member 16 and the plate 14.

The invention is susceptible of various changes in its form, proportions and minor details of construction and the right is herein reserved to make such changes as properly fall within the scope of the appended claim.

Having described the invention what is claimed is:—

A pneumatic tire protector comprising a flexible protecting member, rim engaging members, plates secured to the opposite side edges of the protecting members, sleeves carried by the plates, sleeves also carried by the rim engaging members, pins extending through said sleeves and links connecting the adjacent ends of the pins to provide a flexible connection between the tire protector and rim engaging member.

In testimony whereof I affix my signature.

HARLEY W. EDWARDS.